(12) United States Patent
Park

(10) Patent No.: US 9,086,283 B2
(45) Date of Patent: Jul. 21, 2015

(54) APPARATUS AND METHOD FOR ESTIMATING LOCATION OF TERMINAL USING DEAD RECKONING

(71) Applicant: ELECTRONICS AND TELECOMMUNICATIONS RESEARCH INSTITUTE, Daejeon (KR)

(72) Inventor: Manho Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 114 days.

(21) Appl. No.: 13/871,867

(22) Filed: Apr. 26, 2013

(65) Prior Publication Data

US 2014/0121960 A1    May 1, 2014

(30) Foreign Application Priority Data

Oct. 31, 2012 (KR) .......................... 10-2012-0122469

(51) Int. Cl.
*G01C 21/12* (2006.01)
(52) U.S. Cl.
CPC ...................................... *G01C 21/12* (2013.01)

(58) Field of Classification Search
CPC ........................................................ G01C 21/12
USPC ................. 701/469, 472, 468, 494, 500, 501;
455/456.1, 556.1; 340/933, 88, 995.25;
342/357.2, 357.06, 357.12, 450, 457
See application file for complete search history.

(56) References Cited

U.S. PATENT DOCUMENTS

| | | |
|---|---|---|
| 6,459,903 B1 | 10/2002 | Lee |
| 2010/0268465 A1* | 10/2010 | Hegde ............................ 701/216 |
| 2010/0324822 A1* | 12/2010 | Coatantiec et al. ............ 701/216 |
| 2011/0054790 A1* | 3/2011 | Kagawa et al. ................ 701/214 |
| 2014/0129136 A1* | 5/2014 | Celia ............................... 701/445 |

FOREIGN PATENT DOCUMENTS

| | | |
|---|---|---|
| KR | 10-2000-0060020 A | 10/2000 |
| KR | 10-2011-0049625 A | 5/2011 |

* cited by examiner

*Primary Examiner* — Richard Camby
(74) *Attorney, Agent, or Firm* — Rabin & Berdo, P.C.

(57) ABSTRACT

An apparatus for estimating the location of a terminal obtains definite location information of the terminal, estimates a dead reckoning location of the terminal using finally obtaining definite location information when definite location information of the terminal is not obtained for a set time, and combines positioning information of an adjacent terminal, definite location information of the terminal, and dead reckoning location information of the terminal with each other when reliability of dead reckoning location information of the adjacent terminal is higher than reliability of dead reckoning of the terminal to estimate combinatorial location information of the terminal.

17 Claims, 4 Drawing Sheets

APPARATUS AND METHOD FOR ESTIMATING LOCATION OF TERMINAL USING DEAD RECKONING

CROSS-REFERENCE TO RELATED APPLICATION

This application claims priority to and the benefit of Korean Patent Application No. 10-2012-0122469 filed in the Korean Intellectual Property Office on Oct. 31, 2012, the entire contents of which are incorporated herein by reference.

BACKGROUND OF THE INVENTION (a) Field of the Invention

The present invention relates to an apparatus and a method for estimating the location of a terminal using dead reckoning.

(b) Description of the Related Art

Dead reckoning is a technology for estimating movement distance and movement direction of a user using inertial sensors such as an acceleration sensor, a magnetometer, and a gyro sensor, as well as additional information, even in an environment where a definite location information providing service such as a global positioning system (GPS) is not provided, to estimate a relative location change from a finally obtained definite location and to estimate the location of the user.

However, dead reckoning commonly has drawbacks in that performance is deteriorated by the performance of a sensor or various peripheral factors so that it is difficult to measure the correct location of a terminal and in that errors are accumulated by the movement distance and the motion path of the dead reckoning performed from the finally obtained definite location so that the accuracy of the location is reduced. In addition, positioning resource information and dead reckoning related information that may be obtained by one terminal are limited, so applicable positioning methods are limited and a positioning function is not performed when minimum necessary conditions in accordance with the respective positioning methods are not satisfied so that a positioning service for a user is limited.

SUMMARY OF THE INVENTION

The technical object of the present invention is to provide an apparatus and a method for estimating the location of a terminal using dead reckoning that is capable of improving availability and reliability of a positioning service.

According to an exemplary embodiment of the present invention, an apparatus for estimating the location of a terminal is provided. The location estimating apparatus includes a location information obtaining unit, a dead reckoning unit, and a location estimating and correcting unit. The location information obtaining unit obtains definite location information of the terminal. The dead reckoning unit estimates the dead reckoning location of the terminal using definite location information finally obtained by the location information obtaining unit.

The location estimating and correcting unit combines positioning information of an adjacent terminal, definite location information of the terminal, and dead reckoning location information of the terminal with each other to estimate the location of the terminal.

The location estimating and correcting unit uses positioning information of an adjacent terminal of which dead reckoning location information has relatively high reliability for estimating the location of the terminal.

The location estimating and correcting unit calculates a dead reckoning location information weight value that represents reliability of dead reckoning location information of the terminal using a definite location information weight value that represents reliability for the definite location information.

The definite location information weight value is calculated using a positioning resource characteristic and factor and probabilistic characteristics.

The dead reckoning location information weight value is calculated using the definite location information weight value and dead reckoning location information and a movement characteristic of the terminal.

The location estimating apparatus further includes an information exchanging unit for detecting the adjacent terminal and for exchanging positioning information with the adjacent terminal, The positioning information comprises at least one of definite location information, dead reckoning location information, definite location information weight value, and dead reckoning location information weight value.

The location estimating and correcting unit determines whether combinatorial location estimation may be applied when the terminal is an adjacent terminal of another terminal and the information exchanging unit transmits a part of positioning information of the terminal to the other terminal when the combinatorial location estimation may be applied.

The location estimating and correcting unit estimates the location of the terminal and increases the number of combinatorial location corrections.

The location estimating and correcting unit collects peripheral positioning resource information and uses the peripheral positioning resource information for estimating the location of the terminal.

The location estimating and correcting unit estimates a distance between the terminal and the adjacent terminal from the peripheral positioning resource information, and estimates the location of the terminal using the estimated distance and the peripheral positioning resource information includes received signal strength indication (RSSI) information.

The method includes obtaining definite location information of the terminal, estimating a dead reckoning location of the terminal using finally obtained definite location information, exchanging dead reckoning location information of the terminal and reliability of the dead reckoning location information with an adjacent terminal, and combining positioning information of the adjacent terminal, definite location information of the terminal, and dead reckoning location information of the terminal with each other to estimate the location of the terminal when reliability of dead reckoning location information of the adjacent terminal is higher than reliability of dead reckoning of the terminal.

Estimating the location of the terminal further includes estimating the dead reckoning location as the location of the terminal when reliability of dead reckoning location information of the adjacent terminal is lower than reliability of dead reckoning of the terminal.

Estimating the dead reckoning location includes calculating a definite location information weight value that represents reliability of the definite location information using a characteristic of positioning resource and factor and probabilistic characteristics used for obtaining the definite location information, and calculating a dead reckoning location information weight value that represents reliability of dead reckoning location information of the terminal using the definite location information weight value and dead reckoning location information and a movement characteristic of the terminal.

In estimating the location of the terminal, it is determined that reliability is high when the dead reckoning location information weight value is high.

The method further includes transmitting positioning information of the terminal to the adjacent terminal when reliability of dead reckoning location information of the adjacent terminal is lower than reliability of dead reckoning of the terminal.

Estimating the location of the terminal comprises increasing the number of combinatorial location corrections of the terminal.

The method further includes estimating the dead reckoning location as the location of the terminal when the number of combinatorial location corrections of the terminal is larger than a predetermined threshold value.

According to an exemplary embodiment of the present invention, a dead reckoning terminal performs a combinatorial positioning process with another dead reckoning terminal while performing a dead reckoning function. Therefore, it is possible to use positioning resources and factors are not used in a conventional positioning method and to share location information of high precision so that it is possible to improve availability and accuracy of a positioning service.

DETAILED DESCRIPTION OF THE EMBODIMENTS

Figure 1:
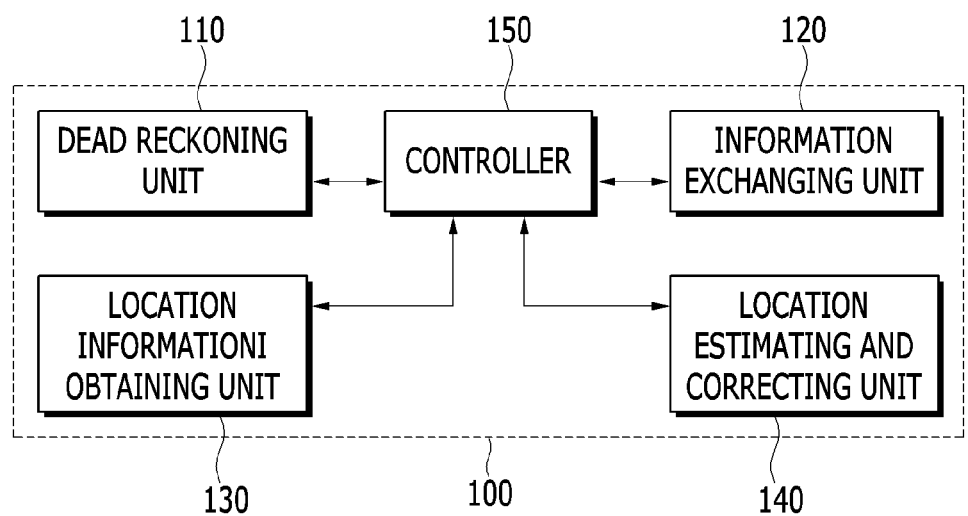
FIG. 1 is a view illustrating an apparatus for estimating the location of a terminal using dead reckoning according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification and claims, unless explicitly described to the contrary, the word "comprise" and variations such as "comprises" or "comprising" will be understood to imply the inclusion of stated elements but not the exclusion of any other elements.

An apparatus and a method for estimating the location of a terminal using dead reckoning according to an exemplary embodiment of the present invention will be described in detail with reference to the accompanying drawings.

FIG. 1 is a view illustrating an apparatus for estimating the location of a terminal using dead reckoning according to an exemplary embodiment of the present invention.

Referring to FIG. 1, a location estimating apparatus 100 includes a dead reckoning unit 110, an information exchanging unit 120, a location information obtaining unit 130, a location estimating and correcting unit 140, and a controller 150. A terminal (not shown) includes the location estimating apparatus 100, and may include a terminal and a mobile communication terminal attached to a vehicle.

The dead reckoning unit 110 estimates the location of the terminal by dead reckoning using various sensors included in the terminal. The various sensors may include inertial sensors, for example, an acceleration sensor, a magnetometer, and a gyro sensor.

The dead reckoning unit 110 activates a dead reckoning function when a predetermined condition is satisfied, and when the dead reckoning function is activated, estimates relative movement direction and relative movement distance of the terminal from definite location information finally obtained by a global positioning system (GPS) using the various sensors included in the terminal. At this time, the predetermined condition may be set as a condition in which location information is not obtained by an apparatus such as the GPS for no less than a predetermined time.

The information exchanging unit 120 detects an adjacent terminal, exchanges information required for combinatorial location estimation with the adjacent terminal when the adjacent terminal exists, and verifies whether the exchanged information of the adjacent terminal is suitable for the combinatorial location estimation. The information exchanging unit 120 transmits the information of the adjacent terminal to the location estimating and correcting unit 140 when the information of the adjacent terminal is suitable for the combinatorial location estimation. Information required for the combinatorial location estimation may include location information estimated by dead reckoning, and definite location information collected by the location information obtaining unit 130.

The location information obtaining unit 130 collects the definite location information of the terminal based on information on various positioning resources and corresponding positioning resources. Positioning resources and methods may include positioning using a satellite navigation system such as the GPS, positioning using a communication network, positioning using resources such as Wi-Fi or a sensor network, and positioning using a proximity tag method.

The location estimating and correcting unit 140 combines the information of the adjacent terminal received by the information exchanging unit 120, the definite location information of the terminal collected by the location information obtaining unit 130, and the location information of the terminal estimated by the dead reckoning unit 100 to estimate the location information of the terminal. Here, when distinguishing the location information estimated by the location estimating and correcting unit 140 from the location information estimated by the dead reckoning unit 110, the location information estimated by the location estimating and correcting unit 140 is referred to as combinatorial location information and the location information of the terminal estimated by the dead reckoning unit 110 is referred to as dead reckoning location information.

The location estimating and correcting unit 140 verifies and corrects the dead reckoning location information using the estimated combinatorial location information.

The controller 150 controls the dead reckoning unit 110, the information exchanging unit 120, the location information obtaining unit 130, and the location estimating unit 140 in order to estimate the location of the terminal.

Figure 2A:
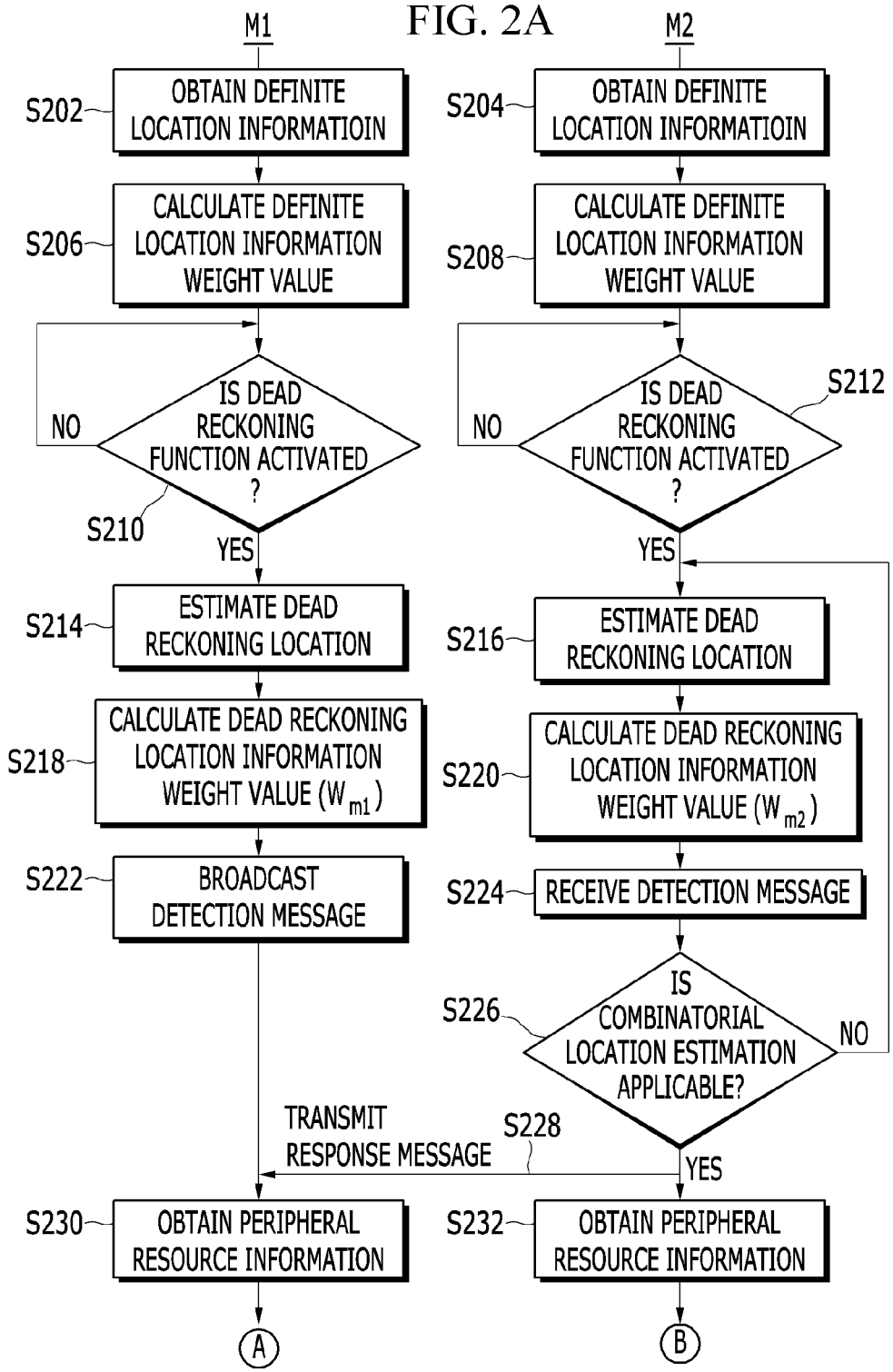
FIG. 2A and FIG. 2B are flowcharts illustrating a location estimating method of the apparatus for estimating the location of a terminal using dead reckoning according to the exemplary embodiment of the present invention.
Figure 2B:
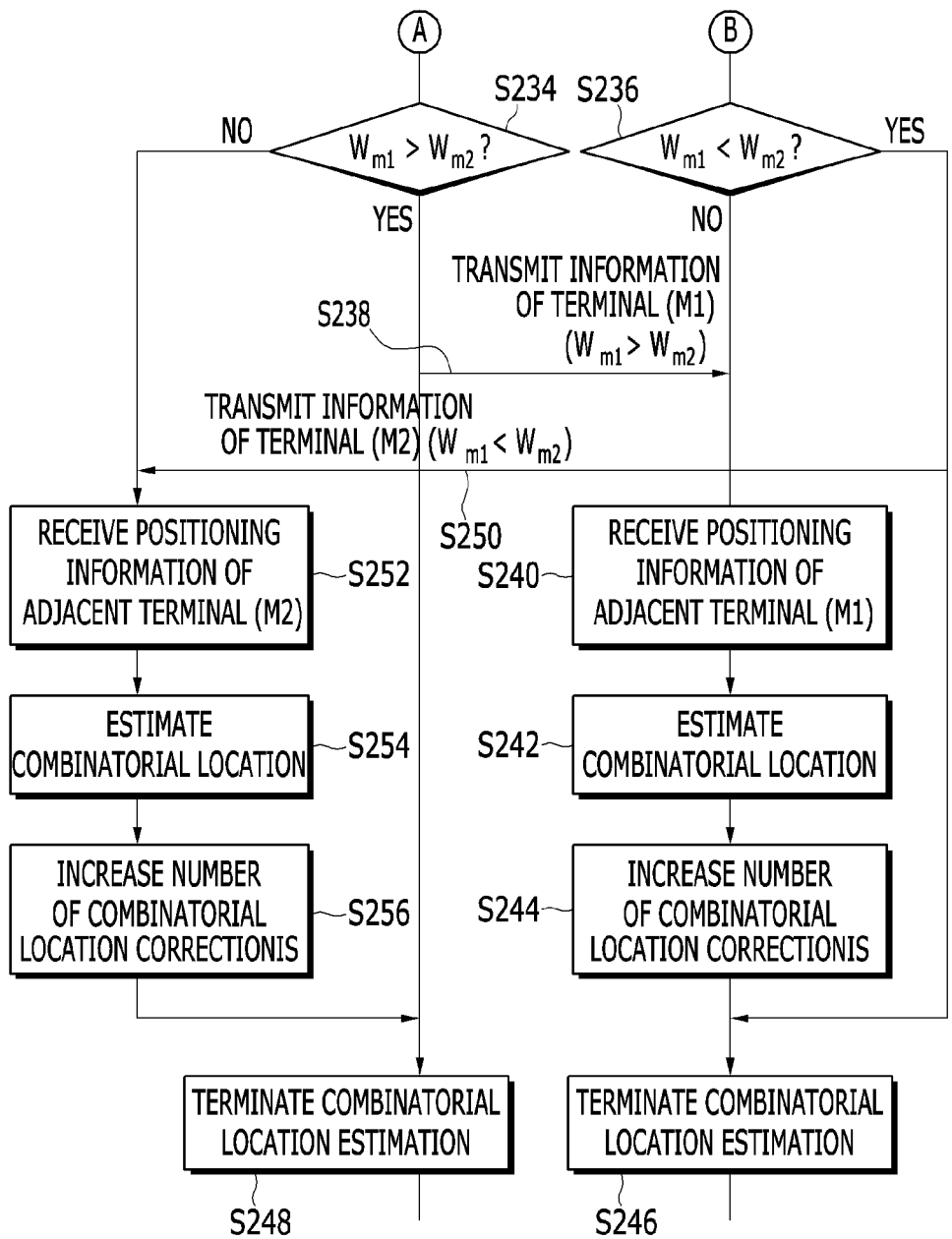

FIG. 2A and FIG. 2B are flowcharts illustrating a location estimating method of the apparatus for estimating the location of a terminal using dead reckoning according to the exemplary embodiment of the present invention. In FIG. 2A and FIG. 2B, it is assumed that weight value information is inversely proportional to an error range of respective location information items.

Referring to FIG. 2A, the location information obtaining unit 130 of each of terminals M1 and M2 obtains definite location information (S202 and S204). The terminals M1 and M2 calculate definite location information weight values in consideration of positioning resource characteristics and factor and probabilistic characteristics of the obtained definite location information (S206 and 208).

On the other hand, when the definite location information is not obtained for a predetermined time, the terminals M1 and M2 activate a dead reckoning function.

When the dead reckoning function is activated (S210 and S212), the terminals M1 and M2 estimate a dead reckoning location using the finally obtained definite location information (S214 and S216).

The terminals M1 and M2 calculate dead reckoning location information weight values $W_{m1}$ and $W_{m2}$ of dead reckoning location information using definite location information weight values (S218 and S220). The dead reckoning location information weight values may be calculated as described in Equation 1.

$$W_{mi} = Wo - (l \times W_l + n_t \times W_t + n_u \times W_u + n_v \times W_v) \quad \text{(Equation 1)}$$

Herein, Wo represents a definite location information weight value;

l represents a movement distance estimated by dead reckoning, $W_l$ represents a weight value for a unit distance, $n_t$ represents the number of left and right turns, $W_t$ represents a weight value for the left and right turns, $n_u$ represents the number of 180-degree turns, $W_u$ represents a weight value for the 180-degree turns, $n_v$ represents the number of vertical movements, and $W_v$ represents a weight value for the vertical movements.

Next, each of the terminals M1 and M2 detects whether an adjacent terminal exists. From now on, for convenience sake, description will be made based on the terminal M1.

The terminal M1 broadcasts a detection message in order to detect an adjacent terminal (S222). When the terminal M2 exists in an area adjacent to the terminal M1, the terminal M2 may receive the broadcasted detection message (S224). The detection message may include the dead reckoning location information of the terminal M1 and the dead reckoning location information weight value of the terminal M1.

The adjacent terminal M2 determines whether combinatorial location estimation may be applied with reference to the detection message received from the terminal M1 (S226). The adjacent terminal M2 may determine that the combinatorial location estimation may be applied when all of the conditions of Equation 2, Equation 3, and Equation 4 are satisfied. At this time, when it is determined that the combinatorial location estimation may not be applied, the adjacent terminal M2 does not perform the combinatorial location estimation but may determine the dead reckoning location of the adjacent terminal M2 as the location of the adjacent terminal M2.

The adjacent terminal M2 may determine that the combinatorial location estimation may be applied when the number of combinatorial location corrections of the adjacent terminal M2 is no more than a predetermined threshold value, when a difference in an estimated distance between the terminal M1 and the adjacent terminal M2 is no more than a predetermined threshold value, and when a relationship between the dead reckoning location information weight value of the terminal M1 and the dead reckoning location information weight value of the adjacent terminal M2 satisfies a predetermined condition of Equation 4.

$$|Pos_1 - Pos_2| \leq Pos_{thr} \quad \text{(Equation 2)}$$

$$N_c \leq N_{thr} \quad \text{(Equation 3)}$$

$$W_{m1} + W_{m2} > W_{s\_thr},$$

$$W_{m1} - W_{m2} > W_{d\_thr} \quad \text{(Equation 4)}$$

Herein, $Pos_i$ represents the location of an i-th terminal, $Pos_{thr}$ represents a threshold value of a distance for estimating combinatorial location information, $N_c$ represents the number of combinatorial location corrections of the adjacent terminal M2, $N_{thr}$ represents a threshold value for the number of combinatorial location estimations, $W_{mi}$ represents a dead reckoning weight value that the i-th terminal has, $W_{s\_thr}$ represents a threshold value of a weight value sum, and $W_{d\_thr}$ represents a threshold value of a weight value difference.

When it is determined that the combinatorial location estimation may be applied, the adjacent terminal M2 transmits a response message for the detection message to the terminal M1 (S228). When it is determined that the combinatorial location estimation may not be applied, the terminal M2 ignores the detection message and continuously performs the dead reckoning function. In FIG. 2A, for convenience sake, it is illustrated that the combinatorial location estimation may be applied to the terminal M2 among adjacent terminals.

The terminal M1 and the adjacent terminal M2 obtain peripheral positioning resource information such as Wi-Fi AP that may be used for estimating a distance between terminals through scanning after uniform time delays, respectively (S230 and S232). The terminal M1 and the adjacent terminal M2 select peripheral positioning resource information items of a predetermined number from the obtained peripheral positioning resource information in a predetermined priority. For example, five peripheral positioning resource information items having large received signal strength indications (RSSI) may be selected from the obtained peripheral positioning resource information. The selected peripheral positioning resource information items are exchanged with each other to be used for correcting the dead reckoning location information.

Referring to FIG. 2B, after the terminal M1 and the adjacent terminal M2 collect the peripheral positioning resource information items, respectively, dead reckoning location information weight values are compared with each other so that it is determined which terminal has a larger dead reckoning location information weight value between the two terminals M1 and M2 (S234 and S236). Here, since it is assumed that weight value information items are inversely proportional to the error range of the respective location information items, the dead reckoning location information weight value being large means that the reliability (or accuracy) of the dead reckoning location information is high.

The terminal with high reliability of the dead reckoning location information functions as a supplementary definite location information provider of the terminal with low reliability of the dead reckoning location information.

When the dead reckoning location information weight value $W_{m1}$ of the terminal M1 is larger than the dead reckoning location information weight value $W_{m2}$ of the adjacent terminal M2 (S234), the terminal M1 transmits the definite location information and the definite location information weight value of the terminal M1, the dead reckoning location information and the dead reckoning location information weight value of the terminal M1, and selected peripheral positioning resource information to the adjacent terminal M2 (S240). The terminal M1 then terminates the combinatorial location estimation (S248). In this case, the terminal M1 may determine the dead reckoning location of the terminal M1 as the location of the terminal M1.

When the adjacent terminal M2 receives the definite location information and the definite location information weight value of the terminal M1, the dead reckoning location information and the dead reckoning location information weight value of the terminal M1, and the selected peripheral positioning resource information received from the terminal M1 (S240), the combinatorial location information is estimated using the received positioning information of the adjacent terminal M2 (S242) so that the location of the adjacent terminal M2 is verified and corrected.

After the adjacent terminal M2 estimates the combinatorial location information, the number of combinatorial location corrections is increased by one (S243) and the combinatorial location estimation is terminated (S246).

On the other hand, when the dead reckoning location information weight value of the terminal M1 is no more than the dead reckoning location information weight value of the adjacent terminal M2 (S234), the terminal M1 does not transmit the positioning information of the terminal M1 to the adjacent terminal M2.

When the dead reckoning location information weight value of the terminal M1 is smaller than the dead reckoning location information weight value of the adjacent terminal M2 (S236), the adjacent terminal M2 transmits the definite location information and the definite location information weight value of the adjacent terminal M2, the dead reckoning location information and the dead reckoning location information weight value of the adjacent terminal M2, and the peripheral positioning resource information to the terminal M1 (S250). When the terminal M1 receives the positioning information of the adjacent terminal M2 from the adjacent terminal M2 having a larger dead reckoning location information weight value (S252), the combinatorial location information is estimated using the positioning information of the adjacent terminal M2 (S254), the number of combinatorial location corrections is increased by one (S256), and the combinatorial location estimation is terminated (S248).

Now, referring to FIG. 3, a method of estimating combinatorial location information according to an exemplary embodiment of the present invention will be described.

Figure 3:
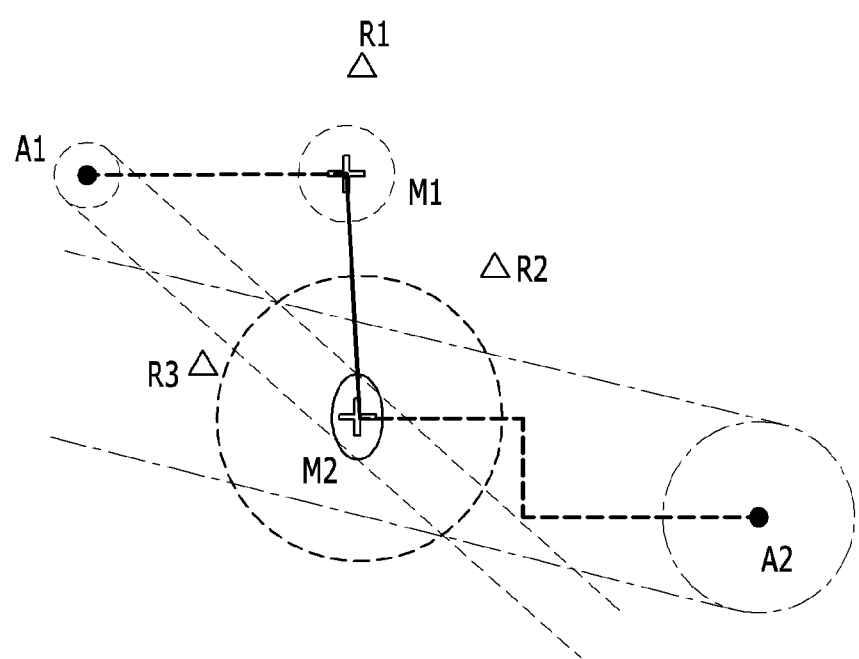
FIG. 3 is a view illustrating an example of a method of estimating combinatorial location information and of correcting dead reckoning location information according to an exemplary embodiment of the present invention.

FIG. 3 is a view illustrating an example of a method of estimating combinatorial location information and of correcting dead reckoning location information according to an exemplary embodiment of the present invention.

When a terminal that starts or performs dead reckoning obtains definite location information to be used for the dead reckoning and uses the definite location information as a base point location, the accuracy of estimation of the base point location is significantly affected by the kind and environment of the positioning resource. Therefore, when the base point location is obtained, the terminal calculates a definite location information weight value that reflects reliability of definite location information in consideration of the location information of the corresponding base point, the kind of the positioning resource used for measuring the base point location, peripheral factors, and probabilistic characteristics.

Then, the terminal performs a function of estimating a relative location change in the terminal through the dead reckoning using the definite location information as the starting location. At this time, the terminal is affected by the accuracy of the dead reckoning by the performance of used sensor and algorithm. Particularly, the accuracy of the dead reckoning is reduced in proportion to the movement distance of the terminal in a uniform level. Furthermore, when a direction change such as left and right turns and a 180-degree turn and a special type of movement such as vertical movement are generated, the accuracy of the dead reckoning is rapidly reduced. Therefore, when it is estimated that an error in the movement distance is increased and that special movement is generated, the terminal calculates a dead reckoning location information weight value that reflects the above.

In FIG. 3, the terminal M1 performs linear movement without special movement using a base point location A1 as a starting point, and the terminal M2 performs special movement several times using a base point location A2 as a starting point. In FIG. 3, it may be assumed that the dead reckoning of the terminal M1 has high reliability and that an error range having a uniform level of reliability is narrow. However, it may also be assumed that the dead reckoning of the terminal M2 has low reliability and that an error range having a uniform level of reliability is wide.

Then, the terminal M2 that performs the dead reckoning of relatively low reliability collects the positioning information of the adjacent terminal M1. The terminal M2 that collects the positioning information of the adjacent terminal M1 applies the estimation reliabilities of the base point locations A1 and A2 and the probabilistic characteristic of a base point error to an angle of arrival positioning method to determine the actual reachable range of the terminal M2. The above means that the range of a reachable region from the base point locations A1 and A2 to the adjacent terminal M1 is equal to the error range of the base point locations A1 and A2.

Next, the terminal M2 measures the distance between the terminal M2 and the adjacent terminal M1 using the peripheral positioning resource information received from the adjacent terminal M1 and the same peripheral positioning resource information measured by the terminal M2. At this time, RSSI information may be used as the peripheral positioning resource information, and the dead reckoning location of the terminal having relatively high reliability is used as another definite location.

When an RSSI method is used, a path loss model in an ideal free space may be represented as in Equation 5.

$$P_r = P_t \frac{G_t G_r \lambda^2}{(4\pi d)^2} \quad \text{(Equation 5)}$$

Herein, Pr represents received power, Pt represents transmission power, G represents an antenna gain, $\lambda$ represents a wavelength, and d represents a distance between two terminals.

Therefore, when a change in the measured values of the two terminals M1 and M2 is calculated using the same peripheral positioning resource information measured by the two terminals M1 and M2 that perform the dead reckoning, the distance between the two terminals M1 and M2 may be estimated. At this time, the estimated distance between the terminals M1 and M2 is significantly affected by the peripheral positioning resource and the disposition of the terminals. When the disposition of FIG. 3 is performed, a change in the path loss of the signal of a peripheral positioning resource R1 is most significant. Therefore, when an RSSI model is applied to peripheral positioning resource information items of a predetermined number, a value having the largest change in reception strength is assumed as disposition on a linear path closest to a virtual linear path between the two terminals M1 and M2, and the distance between the terminals M1 and M2 is estimated using the disposition. At this time, when it is determined that the estimation distance between the terminals M1 and M2 exists within a predetermined error threshold value, the dead reckoning location of the terminal M1 having high reliability of dead reckoning is assumed to be a supplementary definite location, and it may be assumed that the terminal M2 exists in the location separated by a distance difference $d_{12}$ between the terminals M1 and M2 using the supplementary definite location as a base location. That is, the terminal M2 may assume the location separated by the distance difference $d_{12}$ between the terminals M1 and M2 to be the location of the terminal M2 using the dead reckoning location of the terminal M1 having high accuracy of dead reckoning as the supplementary definite location. At this time, the distance difference $d_{12}$ between the terminals M1 and M2 may be calculated by Equation 6.

$$d_{12} = \begin{cases} \beta \cdot d_{12} + (1-\beta) \cdot d_{est} & \text{, if } \alpha_{min} \cdot d_{12} < d_{est} < \alpha_{max} \cdot d_{12} \\ d_{12} & \text{, else} \end{cases} \quad \text{(Equation 6)}$$

Herein, $\beta$ represents a weight value for a distance between the two terminals M1 and M2 by dead reckoning and an estimated distance by a correction technique, $d_{est}$ represents an estimated distance between the two terminals M1 and M2 by the above method, and $\alpha_{min}$ and $\alpha_{max}$ represent maximum and minimum threshold values for calculating a range to which the estimated distance may be applied.

Then, the terminal M2 that performs combinatorial location estimation adjusts the dead reckoning information weight value of the corresponding terminal in accordance with a predetermined condition, and increases the number of combinatorial location corrections by one to terminate combinatorial location estimating and correcting processes.

An exemplary embodiment of the present invention is not only realized by the above-described apparatus and/or method, but may be realized by a program that performs a function corresponding to the structure of the embodiment of the present invention or by a recording medium in which the program is recorded. Such realization may be easily performed by a person of ordinary skill in the art from the above-described embodiment.

While this invention has been described in connection with what is presently considered to be practical exemplary embodiments, it is to be understood that the invention is not limited to the disclosed embodiments, but, on the contrary, is intended to cover various modifications and equivalent arrangements.

What is claimed is:

1. An apparatus for estimating a location of a terminal, comprising:
   a location information obtaining unit for obtaining definite location information of the terminal;
   a dead reckoning unit for estimating a dead reckoning location of the terminal using definite location information finally obtained by the location information obtaining unit; and
   a location estimating and correcting unit for combining positioning information of an adjacent terminal, definite location information of the terminal, and dead reckoning location information of the terminal with each other to estimate the location of the terminal;
   wherein the location estimating and correcting unit uses positioning information of an adjacent terminal of which dead reckoning location information has relatively high reliability for estimating the location of the terminal.

2. The apparatus of claim 1, wherein the location estimating and correcting unit calculates a dead reckoning location information weight value that represents reliability of dead reckoning location information of the terminal using a definite location information weight value that represents reliability for the definite location information.

3. The apparatus of claim 2, wherein the definite location information weight value is calculated using a positioning resource characteristic and factor and probabilistic characteristics.

4. The apparatus of claim 2, wherein the dead reckoning location information weight value is calculated using the definite location information weight value and dead reckoning location information and a movement characteristic of the terminal.

5. The apparatus of claim 2, further comprising
   an information exchanging unit for detecting the adjacent terminal and for exchanging positioning information with the adjacent terminal,
   wherein the positioning information comprises at least one of definite location information, dead reckoning location information, definite location information weight value, and dead reckoning location information weight value.

6. The apparatus of claim 1, wherein the location estimating and correcting unit determines whether combinatorial location estimation may be applied when the terminal is an adjacent terminal of another terminal, and
   wherein the information exchanging unit transmits a part of positioning information of the terminal to the other terminal when the combinatorial location estimation is applied.

7. An apparatus for estimating a location of a terminal, comprising:
   a location information obtaining unit for obtaining definite location information of the terminal;
   a dead reckoning unit for estimating a dead reckoning location of the terminal using definite location information finally obtained by the location information obtaining unit; and
   a location estimating and correcting unit for combining positioning information of an adjacent terminal, definite location information of the terminal, and dead reckoning location information of the terminal with each other to estimate the location of the terminal;
   wherein the location estimating and correcting unit estimates the location of the terminal and increases a number of combinatorial location corrections.

8. The apparatus of claim 1, wherein the location estimating and correcting unit collects peripheral positioning resource information and uses the peripheral positioning resource information for estimating the location of the terminal.

9. The apparatus of claim 8, wherein the location estimating and correcting unit estimates a distance between the terminal and the adjacent terminal from the peripheral positioning resource information, and estimates the location of the terminal using the estimated distance, and
   wherein the peripheral positioning resource information comprises received signal strength indication (RSSI) information.

10. The apparatus of claim 1, wherein the location information obtaining unit obtains definite location information of the terminal using at least one of a positioning method using a satellite navigation system, a positioning method using a communication network, a positioning method using resources including Wi-Fi or a sensor network, and a proximity tag method.

11. A method of estimating a location of a terminal in an apparatus for estimating the location of the terminal, comprising:

obtaining definite location information of the terminal;

estimating a dead reckoning location of the terminal using finally obtained definite location information;

exchanging positioning information with an adjacent terminal, the positioning information including dead reckoning location information and reliability of the dead reckoning location information; and combining positioning information of the adjacent terminal, the definite location information of the terminal, and the dead reckoning location information of the terminal with each other to estimate the location of the terminal when the reliability of the dead reckoning location information of the adjacent terminal is higher than the reliability of the dead reckoning location information of the terminal.

12. The method of claim 11, further comprising:

estimating the dead reckoning location as the location of the terminal when the reliability of dead reckoning location information of the adjacent terminal is lower than the reliability of the dead reckoning location information of the terminal.

13. The method of claim 11, wherein estimating the dead reckoning location comprises:

calculating a definite location information weight value that represents reliability of the definite location information using a characteristic of a positioning resource and factor and probabilistic characteristics used for obtaining the definite location information; and calculating a dead reckoning location information weight value that represents the reliability of the dead reckoning location information of the terminal using the definite location information weight value, the dead reckoning location information of the terminal and a movement characteristic of the terminal.

14. The method of claim 13, wherein, in estimating the location of the terminal, it is determined that the reliability of the dead reckoning location information of the terminal is high when the dead reckoning location information weight value is high.

15. The method of claim 11, further comprising transmitting positioning information of the terminal to the adjacent terminal when the reliability of the dead reckoning location information of the adjacent terminal is lower than the reliability of the dead reckoning location information of the terminal.

16. The method of claim 11, wherein estimating the location of the terminal comprises increasing a number of combinatorial location corrections of the terminal.

17. The method of claim 16, further comprising estimating the dead reckoning location as the location of the terminal when the number of combinatorial location corrections of the terminal is larger than a predetermined threshold value.

* * * * *